(12) United States Patent (10) Patent No.: US 8,782,319 B2
Wang et al. (45) Date of Patent: Jul. 15, 2014

(54) EXPANDABLE HYBRID STORAGE DEVICE AND COMPUTER SYSTEM AND CONTROL METHOD

(75) Inventors: Chih-Li Wang, New Taipei (TW); Pin-Hsien Su, New Taipei (TW); Wen-Chin Wu, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 812 days.

(21) Appl. No.: 13/032,588

(22) Filed: Feb. 22, 2011

(65) Prior Publication Data

US 2011/0252178 A1 Oct. 13, 2011

(30) Foreign Application Priority Data

Apr. 13, 2010 (TW) ................................ 99111455 A

(51) Int. Cl.
*G06F 13/00* (2006.01)
*G06F 3/06* (2006.01)

(52) U.S. Cl.
CPC ............ *G06F 3/0607* (2013.01); *G06F 3/0635* (2013.01); *G06F 3/068* (2013.01)
USPC ............ 710/313; 710/306; 710/316; 711/115

(58) Field of Classification Search
USPC .......... 710/306, 313, 316, 301, 302; 711/104, 711/115
See application file for complete search history.

(56) References Cited

U.S. PATENT DOCUMENTS

| 2004/0225835 | A1* | 11/2004 | Coulson ........................ 711/114 |
| 2008/0077822 | A1* | 3/2008 | Hara et al. ...................... 714/25 |
| 2008/0155173 | A1* | 6/2008 | Hatano et al. ................. 711/102 |
| 2010/0257300 | A1* | 10/2010 | Hou .............................. 710/306 |
| 2012/0210038 | A1* | 8/2012 | Liu et al. ....................... 710/315 |

FOREIGN PATENT DOCUMENTS

| CN | 1534438 A | 10/2004 |
| CN | 101119343 A | 2/2008 |

OTHER PUBLICATIONS

Office action mailed on Mar. 1, 2013 for the China application No. 201010155410.5, p. 3 line 5-45, p. 4-7 and p. 8 line 1-25.
Office action mailed on Feb. 26, 2014 for the Taiwan application No. 099111455, filing date: Apr. 13, 2010, p. 2-5 and p. 6 line 1-15.

* cited by examiner

*Primary Examiner* — Glenn A Auve
(74) *Attorney, Agent, or Firm* — Winston Hsu; Scott Margo

(57) ABSTRACT

An expandable hybrid storage device for a computer system includes a first storage unit, an expanded storage device including a disk controller and a second storage coupled to the disk controller via a second data transmission interface, and a selection unit coupled to the first storage unit via a first data transmission interface for selectively connecting the first storage unit to a south bridge circuit of the computer system or the expanded storage device, wherein when the expanded storage device connects to the computer system, the selection unit switches the first storage unit to the expanded storage device so that the disk controller is capable of controlling access to the first storage unit or the second storage unit.

26 Claims, 5 Drawing Sheets

EXPANDABLE HYBRID STORAGE DEVICE AND COMPUTER SYSTEM AND CONTROL METHOD

BACKGROUND OF THE INVENTION

1. Field of the Invention

The present invention relates to a hybrid storage device and related computer system and control method, and more particularly, to a hybrid storage device capable of flexibly expanding various storage devices and related computer systems and control method.

2. Description of the Prior Art

A storage device is one of the most important components in a computer system. The storage device is utilized for retaining various digital data or application programs for computing uses. A conventional hard disk drive (HDD) offers advantages of low cost and rapid writing speed, and therefore, is one of the popular types of storage devices. However, during a data access process, both high speed rotation of platter and frequent move operations of the read-write head may consume a lot of electrical power and need much operational time to access the required data. In other words, because the reading speed of the HDD is too slow, the execution efficiency of the whole computer system will be degraded when the traditional HDD is used for storing system initiation data in a boot-up process, resulting in a long boot-up time and causing inconvenience.

Compared with the traditional HDD, a solid state drive (SSD) produced with semiconductor based manufacturing processes applies an electrical reading and writing scheme without any moving parts and also has advantages of low power consumption and quick data access. However, the drawback of the SSD is that it is more expensive than the traditional HDD and has a limited lifetime (limitation in the number of write/erase cycles) so that the SSD is not going to entirely replace the HDD in the computer system soon.

Thus, the prior art provides a hybrid storage device combining the traditional HDD with the SDD to apply in the computer system. Please refer to FIG. 1, which is a schematic diagram of a hybrid storage device 10 according to the prior art. The hybrid storage device 10 includes a disk controller 102, an SSD 104, and a HDD 106. The SSD 104 and the traditional HDD 106 communicate with the disk controller 102 via serial transmission interfaces 108 and 110 respectively. The disk controller 102 exchanges data with a south bridge circuit of a computer system via a serial transmission interface 112. In the hybrid storage device 10, the computer system can apply various storage devices through the control of the disk controller 102. For example, during data storage, the HDD 106 is used for writing data; meanwhile, the data can also be synchronized to the SSD 104. During reading data, the disk controller 102 controls the reading of data to be from the SSD 104. Therefore, during the boot-up process, the computer system can read the required application program from the SSD 104 and carry out the initiation of operating system without waiting for reading data stored in the HDD 106. Accordingly, the hybrid storage device 10 can reduce power consumption of boot-up process and improve the boot-up speed. On the other hand, the prior art can also enhance the access speed of the storage device through a software design for shortening the boot-up time.

For a conventional hybrid storage device, the SSD and the traditional HDD are usually disposed on the same hardware unit. In such a condition, a user can only use the integrated hybrid storage device without performing any expanded configuration. In other words, the user must purchase the above-mention conventional hybrid storage device even though the user already has a traditional HDD. As a result, a user having an upgrading requirement must spend extra upgrading money to realize the hybrid storage device purpose. In addition, if the prior art utilizes the software design manner to enhance the access speed of storage device, the system load of the computer system will be increased substantially. Therefore, taking the extra cost into consideration, the conventional hybrid storage device is not suitable for the user already having traditional hard disk drive.

SUMMARY OF THE INVENTION

It is therefore an objective of the invention to provide a hybrid storage device and related computer system and control method.

An embodiment of the invention discloses an expandable hybrid storage device for a computer system, the expandable hybrid storage device comprising: a first storage unit; an expanded storage device, comprising: a disk controller; and a second storage unit coupled to the disk controller via a second data transmission interface; and a selection unit coupled to the first storage unit via a first data transmission interface for selectively connecting the first storage unit to a south bridge circuit of the computer system and the expanded storage device via a third data transmission interface and a fourth data transmission interface; wherein when the expanded storage device is connected to the computer system, the selection unit switches the first storage unit to connect to the expanded storage device so that the disk controller is capable of controlling access to the first storage unit or the second storage unit.

An embodiment of the invention further discloses a computer system, comprising: a central processing unit for controlling operations of the computer system; a north bridge circuit coupled to the central processing unit for arranging data exchange of the central processing unit with relative components; a south bridge circuit coupled to the north bridge circuit for exchanging data with the central processing unit via the north bridge circuit; a first storage unit coupled to a selection unit via a first data transmission interface; an expanded storage device, comprising: a disk controller; and a second storage unit coupled to the disk controller via a second data transmission interface; and a selection unit for selectively connecting the first storage unit to a south bridge circuit of the computer system and the expanded storage device via a third data transmission interface and a fourth data transmission interface; wherein when the expanded storage device is connected to the computer system, the selection unit switches the first storage unit to connect to the expanded storage device so that the disk controller is capable of controlling access to the first storage unit or the second storage unit.

An embodiment of the invention further discloses a control method of an expandable hybrid storage device for a computer system, the control method comprising: detecting connection status of an expanded storage device; when the expanded storage device is connected to the computer system, switching a first storage unit to connect to the expanded storage device so that a disk controller is capable of performing access control to the first storage unit or a second storage unit; and when the expanded storage device is removed from the computer system, switching the first storage unit to connect to a south bridge circuit of the computer system so that the south bridge circuit has access to the first storage unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
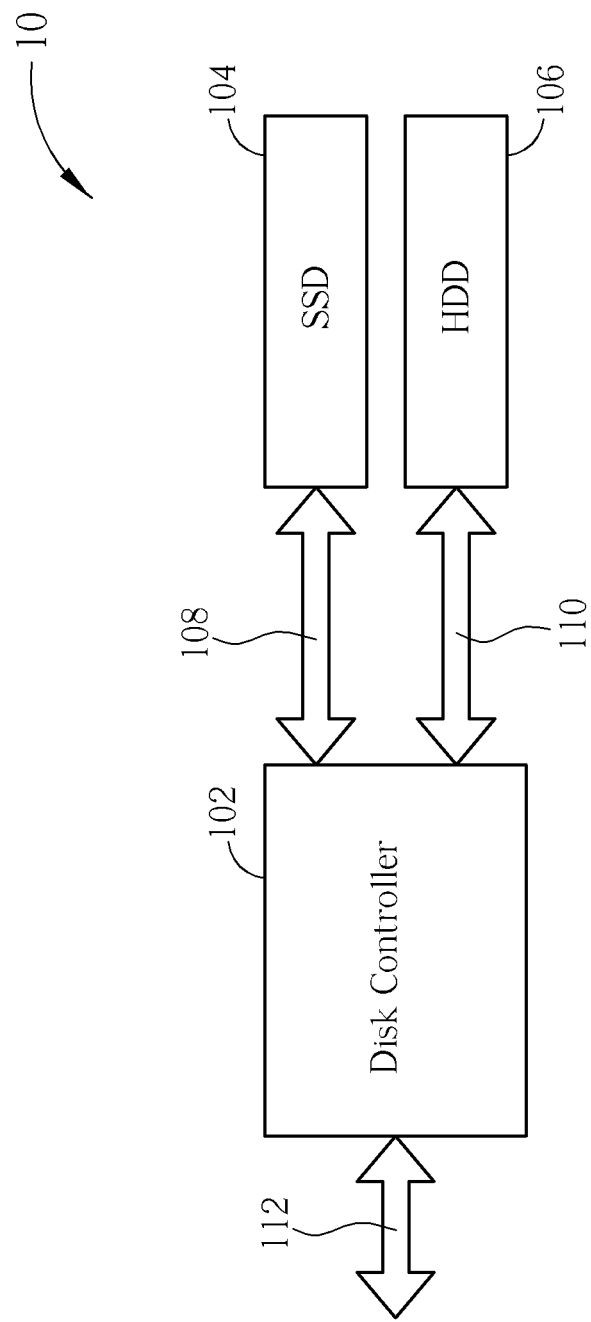
FIG. 1 is a schematic diagram of a hybrid storage device according to the prior art.
Figure 2:
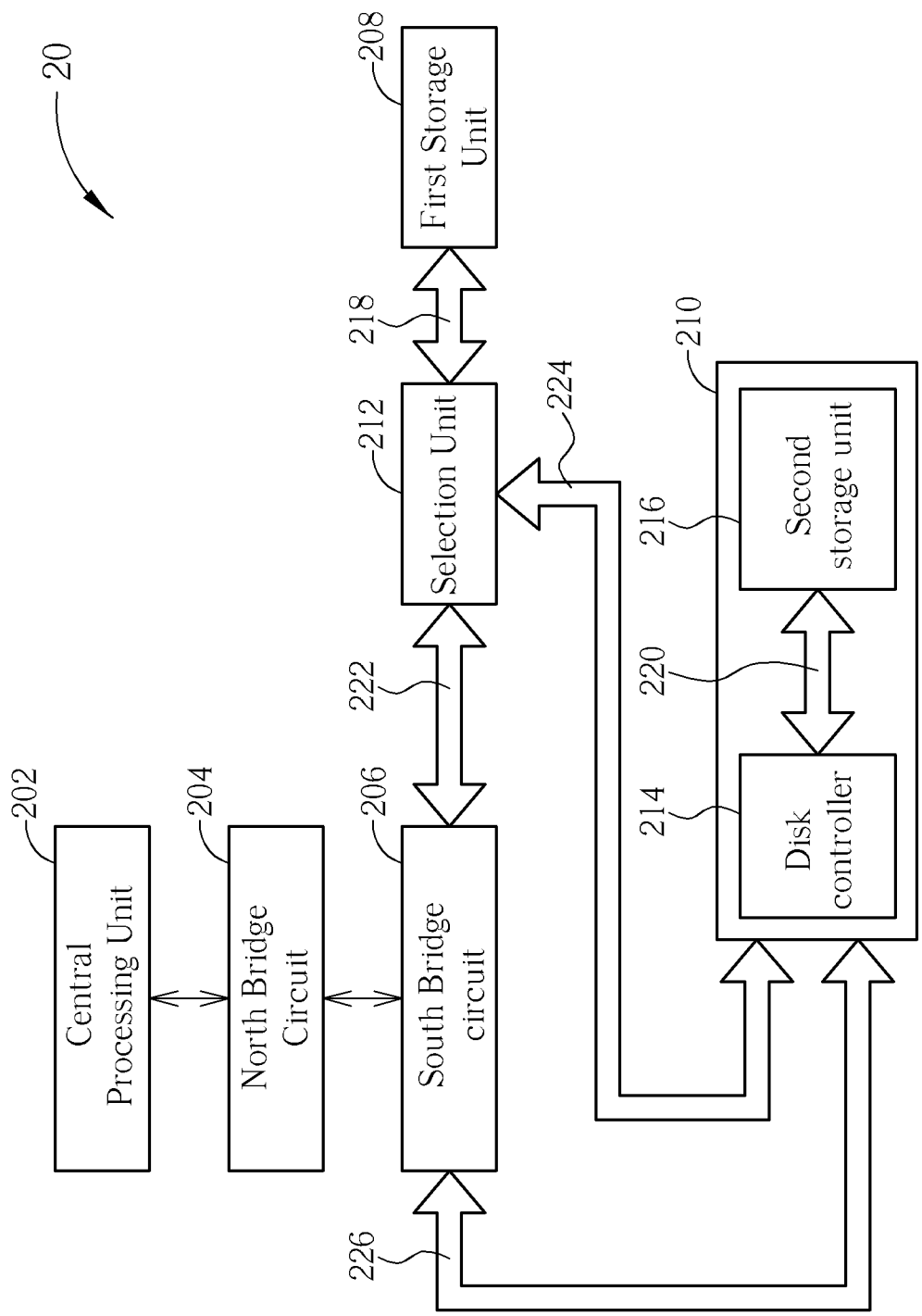
FIG. 2 is a schematic diagram of a computer system according to an embodiment of the invention.

Please refer to FIG. 2, which is a schematic diagram of a computer system 20 according to an embodiment of the invention. The computer system 20 can be a personal computer or a notebook, and this should not be a limitation of the invention. The computer system 20 includes a central processing unit 202, a north bridge circuit 204, a south bridge circuit 206, a first storage unit 208, an expanded storage device 210, and a selection unit 212. The central processing unit 202 is utilized for controlling operations of the computer system 20 to carry out the functions of the computer system 20. The north bridge circuit 204 is coupled to the central processing unit 202 for arranging data exchanges between the central processing unit 202 and relative components. The south bridge circuit 206 is coupled to the north bridge circuit 204 for exchanging data with the central processing unit 202 via the north bridge circuit 204 and accessing data stored in the first storage unit 208 or in the expanded storage device 210. The expanded storage device 210 includes a disk controller 214 and a second storage unit 216. By way of example, and not limitation, the first storage unit 208 includes a hard disk drive, and the second storage unit 216 includes a solid state drive. Furthermore, as shown in FIG. 2, the first storage unit 208 is coupled to the selection unit 212 via a data transmission interface 218. The second storage unit 216 is coupled to the disk controller 214 via a data transmission interface 220. The disk controller 214 is coupled to the south bridge circuit 206 via a data transmission interface 226. Moreover, the selection unit 212 is coupled to the south bridge circuit 206 and the expanded storage device 210 via data transmission interfaces 222 and 224 respectively for selectively connecting the first storage unit 208 to the south bridge circuit 206 or to the expanded storage device 210.

When the expanded storage device 210 is not connected to the computer system 20 or the expanded storage device 210 is removed from the computer system 20, the selection unit 212 makes a connection of the data transmission interface 222 and the data transmission interface 218 so that the first storage unit 208 is capable of connecting to the south bridge circuit 206 via the data transmission interface 222 and the data transmission interface 218. In such a situation, the south bridge circuit 206 can access the data stored in the first storage unit 208. When the expanded storage device 210 is connected to the computer system 20, the selection unit 212 makes a connection of the data transmission interface 224 and the data transmission interface 218 so that the first storage unit 208 can be switched to connect to the expanded storage device 210. Similarly, the disk controller 214 can perform access control to the first storage unit 208 or the second storage unit 216. As a result, the south bridge circuit 206 can access the data stored in the first storage unit 208 or in the second storage unit 216 via the data transmission interface 226 and the disk controller 214. In other words, through the switch control operation of the selection unit 212, the computer system 20 can utilize the south bridge circuit 206 to access data in the first storage unit 208 when the expanded storage device 210 is not connected to the computer system 20; moreover, the computer system 20 can utilize the south bridge circuit 206 to access data in the first storage unit 208 or in the second storage unit 216 via the expanded storage device 210 when the expanded storage device 210 is connected to the computer system 20.

Therefore, the invention can provide a flexible expanded storage device to satisfy the requirement of hybrid storage device in the computer system. Normally, the user can just use the original hard disk drive. Moreover, when the user has other requirements (ex. needs to perform a fast boot process or an instant boot process), the expanded storage device 210 can be connected to the computer system 20 for realizing hybrid storage device functionality. In addition, for users using a traditional hard disk drive, the invention can allow the users to upgrade the their storage device to a hybrid storage device through the expanded storage device 210 without having to spend extra money to purchase a convention hybrid storage device that includes both a traditional hard disk drive and a solid state drive.

The selection unit 212 can be utilized for selecting and switching a connection target for the first storage unit 208. Preferably, the selection unit 212 can be a multiplexer or a switch. In the invention, the selection unit 212 is capable of carrying out the corresponding switch purpose according to connection status of the expanded storage device 210. For example, the invention can detect connection status of the expanded storage device 210 through a basic input output system (BIOS) of the computer system 20 and control the selection unit 212 to implement the corresponding switch manner accordingly. On the other hand, the expanded storage device 210 can be used as a platform of an expanded storage device so that a user is able to set up the required solid state drive on the expanded storage device 210 according to the required type of hybrid storage device. Thus, the second storage unit 216 of the expanded storage device 210 can include any type and number of storage devices based on the user's demand. For example, the second storage unit 216 can be an NAND flash memory, an NOR flash memory, a synchronous dynamic random access memory (SDRAM), or any of these or other types of volatile (or non-volatile) memory alone or in combination.

Figure 3:
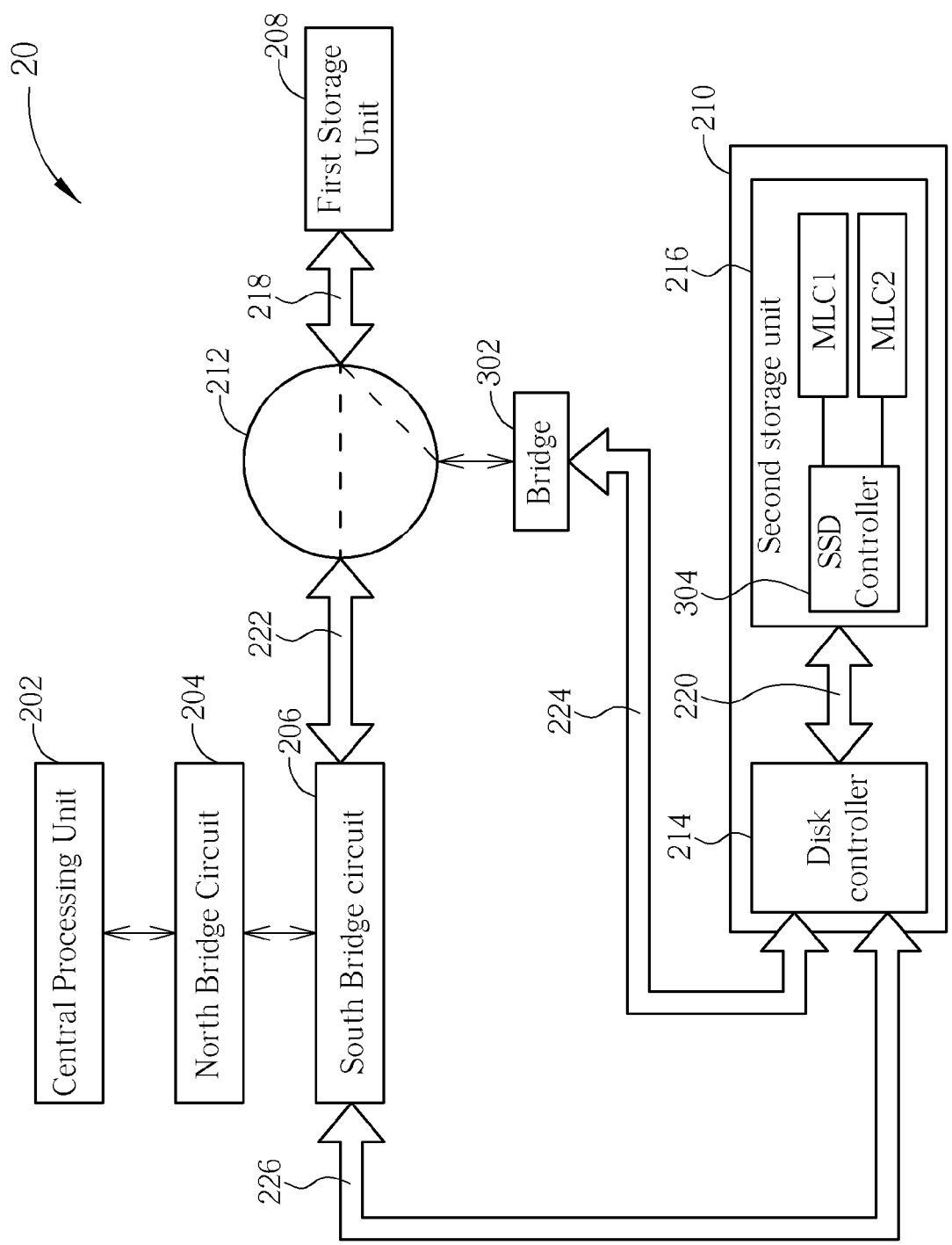
FIG. 3 and FIG. 4 are schematic diagrams of the computer system shown in FIG. 2 according to alternative embodiments of the invention.

Note that the computer system 20 shown in FIG. 2 is an exemplary embodiment of the invention, and those skilled in the art can make alternations and modifications accordingly. For example, referring to FIG. 3, the computer system 20 further includes a bridge 302. The bridge 302 is coupled between the selection unit 212 and the data transmission interface 224 for bridging data transmission between the data transmission interface 218 and the data transmission interface 224 when the selection unit 212 switches the first storage unit 208 to connect to the disk controller 214. The bridge 302 can be directly coupled to the disk controller 214 via the data transmission interface 224. For example, suppose the data transmission interfaces 218 and 222 are respectively a serial advanced technology attachment (SATA) transmission interface and the data transmission interfaces 224 and 226 are respectively a Peripheral Component Interconnect Express (PCIe) transmission interface. In such a situation, the data transmission interface 218 and the data transmission interface 224 are different kinds of data transmission interface so that the bridge 302 can be used for bridging data transmissions. Furthermore, the expanded storage device 210 can include a PCIe mini card for disposing the second storage unit 216 and the disk controller 214, and the second storage unit 216 can be a multi-level cell (MLC) flash memory. As shown in FIG. 3, the second storage unit 216 includes a solid state drive controller 304 and flash memories MLC1 and MLC2. When the computer system 20 detects that the expended storage device 210 has been connected to the computer system 20, the computer system 20 can control the selection unit 212 to switch the first storage unit 208 to connect to the expended storage device 210. For example, when the BIOS of the computer system 20 detects that the expended storage device 210 has been connected to the computer system 20, the BIOS can generate a control signal for controlling the selection unit 212. Accordingly, the selection unit 212 can conduct the connection of the data transmission interface 218 and the data transmission interface 224 (via the bridge 302). Thus, the disk controller 214 can arrange to access data stored in the first storage or in the second storage unit 216. In other words, the south bridge circuit 206 can access data stored in the first storage or in the second storage unit 216 via the data transmission interface 226 and the disk controller 214 based on the access control of the disk controller 214.

Figure 4:
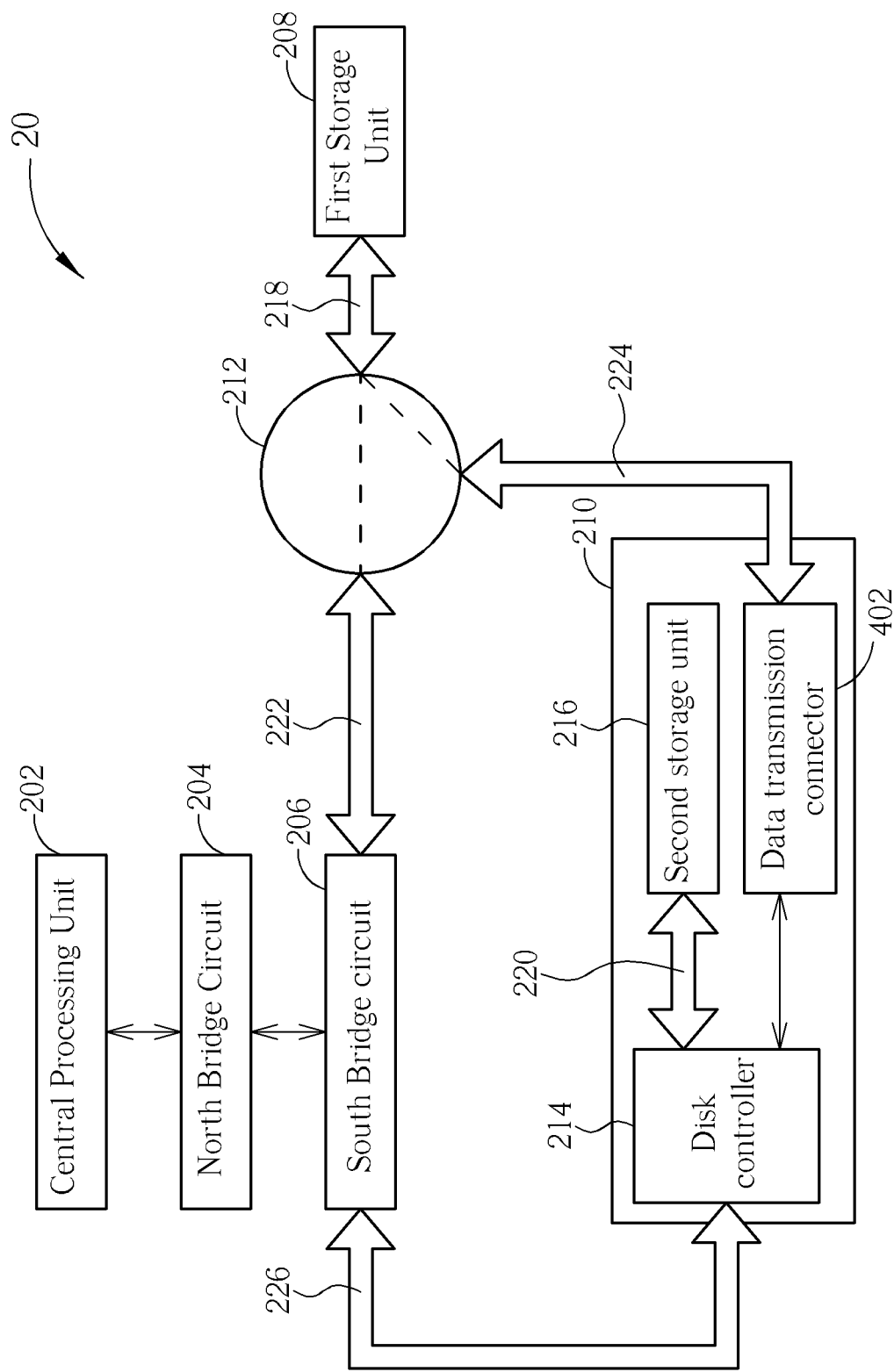

In addition, as shown in FIG. 4, the expended storage device 210 further includes a data transmission connector 402 coupled to the disk controller 214 and also coupled to the selection unit 212 via the data transmission interface 224. The data transmission connector 402 corresponds to the data transmission interface 218 and is able to receive data from or transmit data to the data transmission interface 218. When the computer system 20 detects that the expended storage device 210 has been connected to the computer system 20, the computer system 20 can control the selection unit 212 to switch the first storage unit 208 to connect to the disk controller 214, i.e. the selection unit 212 conducts the connection of the data transmission interface 218 and 224 for realizing the connection between the first storage unit 208 and the data transmission connector 402. Therefore, the disk controller 214 can control access to the first storage unit 208 and the second storage unit 216. As a result, when a user wants to implement a fast enhance boot-up process, the user can utilize the expended storage device 210 to connect to the computer system 20. During boot-up process, the computer system 20 can access related operating system program stored in the second storage unit 216 through the access control of the disk controller 214 for realizing fast access purpose of hybrid storage device.

Note that the computer system 20 is an exemplary embodiment of the invention, and those skilled in the art can make alternations and modifications accordingly. For example, the expended storage device 210 can include a device platform, such as a PCIe mini card, for disposing the disk controller 214 and the second storage unit 216. The data transmission interfaces 218 to 226 can be any type or any interface specification of transmission interfaces which can be utilized for data transmission.

Figure 5:
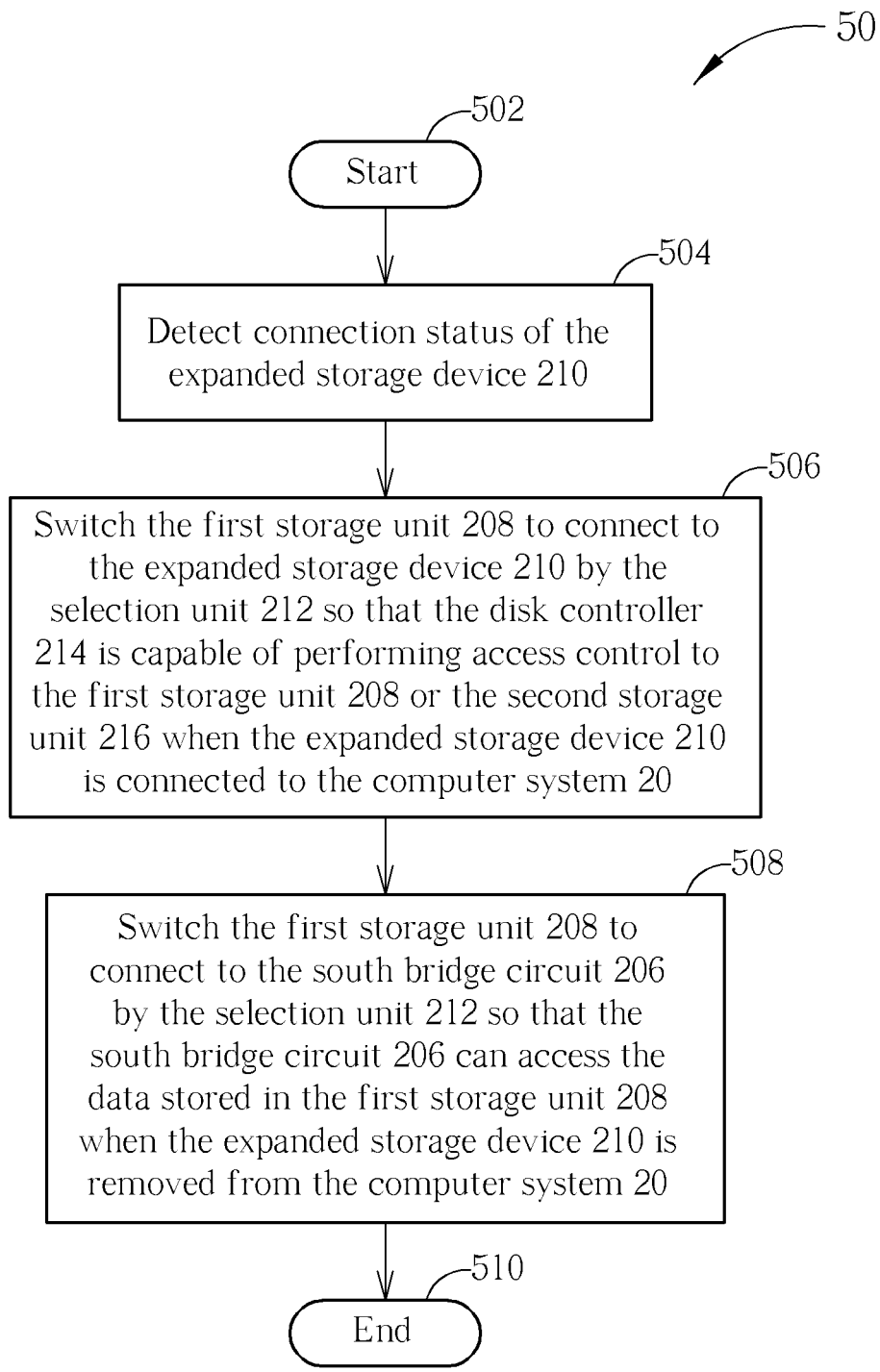
FIG. 5 is a flowchart of a procedure according to an embodiment of the invention.

Please refer to FIG. 5, which is a procedure 50 according to an embodiment of the invention. The procedure 50 is utilized for realizing an operational procedure for the computer system 20. The procedure 50 includes the following steps:

Step 502: Start.
Step 504: Detect connection status of the expanded storage device 210.
Step 506: Switch the first storage unit 208 to connect to the expanded storage device 210 by the selection unit 212 so that the disk controller 214 is capable of performing access control to the first storage unit 208 or the second storage unit 216 when the expanded storage device 210 is connected to the computer system 20.
Step 508: Switch the first storage unit 208 to connect to the south bridge circuit 206 by the selection unit 212 so that the south bridge circuit 206 can access the data stored in the first storage unit 208 when the expanded storage device 210 is removed from the computer system 20.
Step 510: End.

In addition, as the expanded storage device 210 is connected to the computer system, the invention can utilize the selection unit 212 to switch the corresponding connection for achieving flexible expanded hybrid storage device regardless of any kind and number of storage devices including in the second storage unit 216.

In summary, through the switch operation of the selection unit 212, the invention can provide the hybrid storage device 210 capable of flexibly expanding various storage devices for satisfying the requirement of hybrid storage device in the computer system 20. Normally, the user can just use the original hard disk drive. Moreover, when the user has other requirements (ex. performing a fast boot process), the expanded storage device 210 can be connected to the computer system 20 for realizing hybrid storage device function. As a result, the invention can not only offer the advantage of the hybrid storage device, but also preserve flexibility of system design. On the other hand, for users using traditional hard disk drive, the invention can provide the users an opportunity to upgrade their storage device to a hybrid storage device easily without expensive cost.

Those skilled in the art will readily observe that numerous modifications and alterations of the device and method may be made while retaining the teachings of the invention.

What is claimed is:

1. An expandable hybrid storage device for a computer system, comprising:
   a first storage unit;
   an expanded storage device, comprising:
      a disk controller; and
      a second storage unit coupled to the disk controller via a second data transmission interface; and
   a selection unit coupled to the first storage unit via a first data transmission interface, for selectively connecting the first storage unit to a south bridge circuit of the computer system via a third data transmission interface and the first data transmission interface or connecting the first storage unit to the expanded storage device via a fourth data transmission interface and the first data transmission interface;
   wherein when the expanded storage device is connected to the computer system, the selection unit switches the first storage unit to connect to the expanded storage device so that the disk controller is capable of controlling access to the first storage unit or the second storage unit.

2. The expandable hybrid storage device of claim 1, wherein when the expanded storage device is connected to the computer system, the selection unit switches the first storage unit to connect to the disk controller.

3. The expandable hybrid storage device of claim 2 further comprising:
   a bridge coupled between the selection unit and the fourth data transmission interface for bridging data transmission between the first data transmission interface and the fourth data transmission interface when the selection unit switches the first storage unit to connect to the disk controller.

4. The expandable hybrid storage device of claim 1, wherein the expanded storage device further comprises a data transmission connector coupled to the disk controller and the fourth data transmission interface, wherein the data transmission connector corresponds to the first data transmission interface.

5. The expandable hybrid storage device of claim 4, wherein when the expanded storage device is connected to the computer system, the selection unit switches the first storage unit to connect to the data transmission connector via the first data transmission interface and the fourth data transmission interface.

6. The expandable hybrid storage device of claim 1, wherein when the expanded storage device is removed from the computer system, the selection unit switches the first storage unit to connect to the south bridge circuit via the third data transmission interface.

7. The expandable hybrid storage device of claim 1, wherein the disk controller is coupled to the south bridge circuit of the computer system via a fifth data transmission interface.

8. The expandable hybrid storage device of claim 1, wherein the first storage unit comprises a hard disk drive.

9. The expandable hybrid storage device of claim 1, wherein the second storage unit comprises a solid state drive.

10. The expandable hybrid storage device of claim 1, wherein the expanded storage device comprises a Peripheral Component Interconnect Express (PCIe) mini card, wherein the disk controller and the second storage unit are installed on the PCIe mini card and the fourth data transmission interface is a PCIe interface.

11. A computer system, comprising:
a central processing unit for controlling operation of the computer system;
a north bridge circuit coupled to the central processing unit for arranging data exchanges between the central processing unit and relative components;
a south bridge circuit coupled to the north bridge circuit for exchanging data with the central processing unit via the north bridge circuit;
a first storage unit;
an expanded storage device, comprising:
  a disk controller; and
  a second storage unit coupled to the disk controller via a second data transmission interface; and
a selection unit coupled to the first storage unit via a first data transmission interface, for selectively connecting the first storage unit to a south bridge circuit of the computer system via a third data transmission interface and the first data transmission interface or connecting the first storage unit to the expanded storage device via a fourth data transmission interface and the first data transmission interface;
wherein when the expanded storage device is connected to the computer system, the selection unit switches the first storage unit to connect to the expanded storage device so that the disk controller is capable of controlling access to the first storage unit or the second storage unit.

12. The computer system of claim 11, wherein when the expanded storage device is connected to the computer system, the selection unit switches the first storage unit to connect to the disk controller.

13. The computer system of claim 12 further comprising:
a bridge coupled between the selection unit and the fourth data transmission interface for bridging data transmission between the first data transmission interface and the fourth data transmission interface when the selection unit switches the first storage unit to connect to the disk controller.

14. The computer system of claim 11, wherein the expanded storage device further comprises a data transmission connector coupled to the disk controller and the fourth data transmission interface, wherein the data transmission connector corresponds to the first data transmission interface.

15. The computer system of claim 14, wherein when the expanded storage device is connected to the computer system, the selection unit switches the first storage unit to connect to the data transmission connector via the first data transmission interface and the fourth data transmission interface.

16. The computer system of claim 11, wherein when the expanded storage device is removed from the computer system, the selection unit switches the first storage unit to connect to the south bridge circuit via the third data transmission interface.

17. The computer system of claim 11, wherein the disk controller is coupled to the south bridge circuit via a fifth data transmission interface.

18. The computer system of claim 11, wherein the first storage unit comprises a hard disk drive.

19. The computer system of claim 11, wherein the second storage unit comprises a solid state drive.

20. The computer system of claim 11, wherein the expanded storage device comprises a Peripheral Component Interconnect Express (PCIe) mini card, wherein the disk controller and the second storage unit are installed on the PCIe mini card and the fourth data transmission interface is a PCIe interface.

21. A control method of an expandable hybrid storage device for a computer system, the control method comprising:
detecting connection status of an expanded storage device;
when the expanded storage device is connected to the computer system, switching a first storage unit to connect to the expanded storage device so that a disk controller is capable of performing access control to the first storage unit or a second storage unit; and
when the expanded storage device is removed from the computer system, switching the first storage unit to connect to a south bridge circuit of the computer system so that the south bridge circuit is capable of accessing data stored in the first storage unit.

22. The control method of claim 21, wherein when the expanded storage device is connected to the computer system, the selection unit switches the first storage unit to connect to the disk controller.

23. The control method of claim 21, wherein the expanded storage device further comprises a data transmission connector coupled to the disk controller and the fourth data transmission interface, wherein the data transmission connector corresponds to the first data transmission interface.

24. The control method of claim 23, wherein when the expanded storage device is connected to the computer system, the selection unit switches the first storage unit to connect to the data transmission connector.

25. The control method of claim 21, wherein the first storage unit comprises a hard disk drive.

26. The control method of claim 21, wherein the second storage unit comprises a solid state drive.

* * * * *